United States Patent [19]

Van Horssen

[11] Patent Number: 4,691,441
[45] Date of Patent: Sep. 8, 1987

[54] THREAD GAUGE

[76] Inventor: Charles A. Van Horssen, 9233 N. 12 Ave., Phoenix, Ariz. 85021

[21] Appl. No.: 8,278

[22] Filed: Jan. 28, 1987

[51] Int. Cl.⁴ .......................... G01B 3/48; G01B 5/16
[52] U.S. Cl. ................................................... 33/199 R
[58] Field of Search ...................................... 33/199 R

[56] References Cited

U.S. PATENT DOCUMENTS

| 2,536,225 | 1/1951 | Rice | 33/199 R |
| 2,602,347 | 7/1952 | Miller | 33/199 R |
| 2,662,300 | 12/1953 | Foster | 33/199 R |
| 3,064,355 | 11/1962 | Herman | 33/199 R |
| 4,519,144 | 5/1985 | Larsen | 33/199 R |

FOREIGN PATENT DOCUMENTS

| 1536448 | 7/1968 | France | 33/199 R |
| 530891 | 12/1940 | United Kingdom | 33/199 R |

Primary Examiner—Richard R. Stearns
Attorney, Agent, or Firm—Nissle & Leeds

[57] ABSTRACT

An improved thread measuring tool. The tool translates linear motion into rotational motion to provide the motive power for turning a thread gauge into a threaded bore in a workpiece.

2 Claims, 5 Drawing Figures

THREAD GAUGE

This invention relates to a thread measuring tool.

More particularly, the invention relates to a thread measuring tool which translates linear motion into rotational motion to provide the motive power for turning a thread gauge into a threaded bore in a workpiece.

In a further respect, the invention relates to a thread measuring tool which includes an elongate three-dimensional neck having a contact surface that turns around the longitudinal axis of the neck and which includes a drive member slidably mounted on and conformed to the contact surface of the neck such that linear non-rotational movement of the drive member along the neck generates rotational forces acting on the contact surface of the neck.

Thread gauges of the type described and claimed in U.S. Pat. Nos. 4,519,144 to Larsen and 3,046,355 to Herman are well known. Such thread gauges have existed for a great many years and are utilized by grasping and rotating the gauge with the fingers of a hand to turn the calibrated threaded end of the gauge into a bore in a workpiece. When the threaded end of the gauge turns smoothly but snugly into the bore, then the threads in the bore have been correctly formed. While conventional thread gauges provide an accurate, simple way of testing the correctness of threads in a bore, manually turning a thread gauge into a bore and then unscrewing the gauge from the bore takes an appreciable amount of time, particularly when there are a great many workpieces to be tested.

Accordingly, it would be highly desirable to provide an improved thread gauge which would retain the advantage of simple construction found in manually rotated prior art gauges and which would significantly reduce the amount of time required to insert the threaded calibrated portion of the gauge in the internally threaded bore of a workpiece to test the correctness of threads in the bore.

These and other, further and more specific objects and advantages of the invention will be apparent to those skilled in the art from the following detailed description thereof, taken in conjunction with the drawings, in which.

Briefly, in accordance with my invention, I provide an improved thread measuring tool. The tool includes an elongate helical neck having a longitudinal axis and a first end and a second end; a threaded gauge attached to the first end of the neck; and, a drive member slidably mounted on the neck and having an inner helical surface slidably contacting the neck and shaped and dimensioned such that linear non-rotational displacement of the drive member along the neck in a direction of travel generally parallel the longitudinal axis generates forces on the helical neck causing the neck and threaded gauge to rotate.

In another embodiment of the invention I provide an improved method for turning the threads of a gauge over the threads of a workpiece to check the correctness of the workpiece threads. The method includes the steps of connecting the threaded gauge to an elongate helical neck having a longitudinal axis and a first end and a second end; slidably mounting a drive member on the helical neck, the drive member having an inner helical surface slidably contacting the neck and shaped and dimensioned such that linear non-rotational displacement of the drive member along the neck in a direction of travel generally parallel the longitudinal axis generates forces on the helical neck which cause the neck and threaded gauge to rotate; juxtaposing the thread gauge against the workpiece; and, displacing the drive member along the neck in a direction of travel generally parallel the longitudinal axis to rotate the threads of the gauge over the threads of the workpiece.

Figure 1:
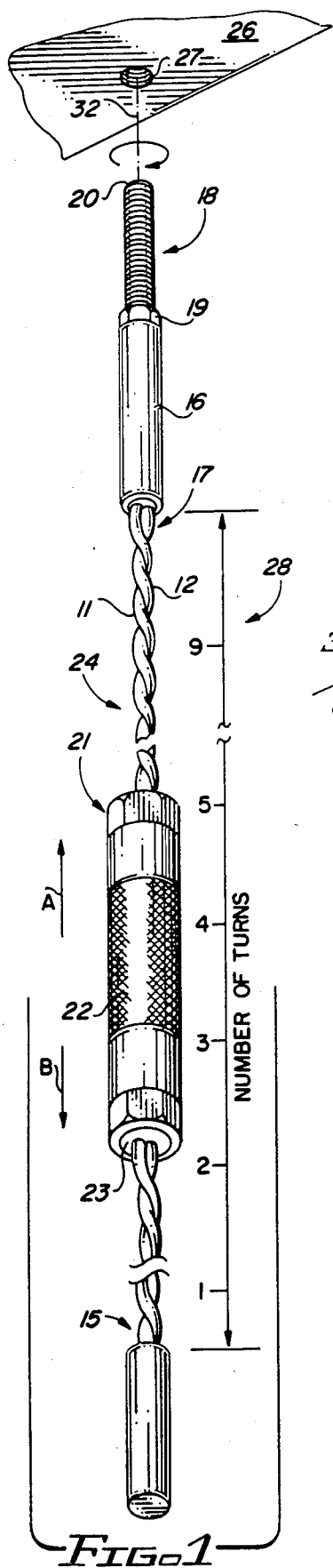
FIG. 1 is a front view of a thread gauge constructed in accordance with the principles of the invention and illustrating the mode of operation thereof.
Figure 2:
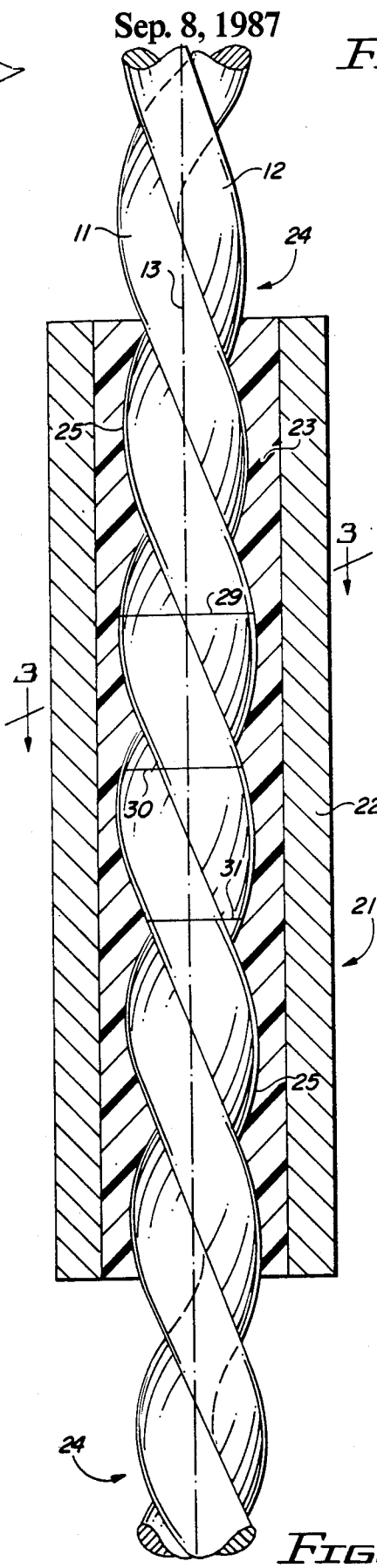
FIG. 2 is a section view of the drive member of the thread gauge of FIG. 1 further illustrating internal construction details thereof.
Figure 3:
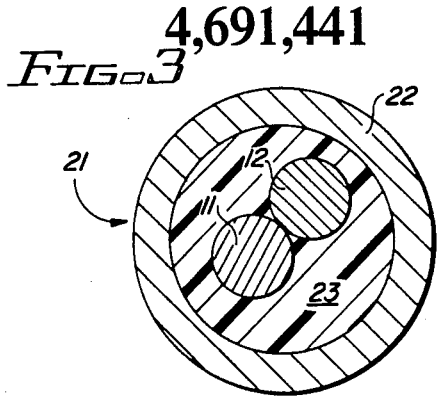
FIG. 3 is a section view of the drive member of FIG. 2 taken along section line 3—3 thereof.

Turning now to the drawings, in which the presently preferred embodiments of the invention are shown for the purpose of illustrating the practice thereof and not by way of limitation of the scope of the invention and in which like reference characters identify corresponding elements throughout the several views, the thread measuring tool of FIGS. 1 to 3 includes an elongate helical neck 24 formed by twisting a pair of wire strands 11, 12 about one another and about longitudinal axis 13. Cylindrical member 14 is connected to one end 15 of helical neck 24 while cylindrical member 16 is attached to the other end 17 of neck 24. Calibrated externally threaded gauge 18 is attached to member 16. In FIG. 1, a gauge 18 is an externally threaded male gauge. Gauge 18 can, if desired, comprise a member having an internally threaded calibrated female bore. Gauge 18 can be a "go" or "no go" gauge. Presently, gauge 18 is attached to member 16 by forming an internally threaded bore in member 16. The bore has a longitudinal axis colinear with axis 13. One end of gauge 18 is threaded into the bore and nut 19 is threaded along gauge 18 and tightened against member 16 in the manner shown in FIG. 1 to secure gauge 18 in member 16. Gauge 18 includes tip 20. Hollow cylindrical housing 22 of drive member 21 encases cylindrical teflon member 23. Teflon member 23 is press fit onto helical neck 24. After member 23 is press fit on neck 24, the inner helical surface 25 of member 23 slidably conforms to the outer contact surfaces of helical neck 24. Workpiece 26 includes internally threaded bore 27 formed therein. As indicated by ruled line 28 in FIG. 1, the distance drive member 21 is displaced along neck 24 can be used to determine the number of turns of gauge 18 into a bore. Evenly spaced rules of marks 29-31 can be made on neck 24 to facilitate determination of the distance that member 22 has traveled along neck 24.

In operation, drive member 21 is positioned on neck 24 immediately adjacent and touching cylindrical member 14. Tip 20 of gauge 18 is positioned adjacent and contacting the mouth of bore 27 such that the longitudinal axis 13 of the thread measuring tool is generally colinear with the longitudinal axis 32 of bore 27. Housing 22 is grasped with the fingers of a hand and is displaced in the direction of arrow A along neck 24. When drive member 21 is displaced in the direction of arrow A, the fingers grasping member 21 generally prevent member 21 from rotating. Consequently, the linear non-rotational displacement of member 22 along helical neck 24 causes neck 24 and gauge 18 to rotate. If the threads in bore 27 are correctly formed, gauge 18 turns smoothly and snugly into bore 27. The number of turns of gauge 18 into bore 27 can be determined by measuring the distance drive member 21 has been displaced away from member 14 and along neck 24 in the direction of arrow A. Gauge 18 is removed from bore 27 by linearly non-rotationally displacing drive member 21 along neck 24 in the direction of arrow B.

Figure 4:
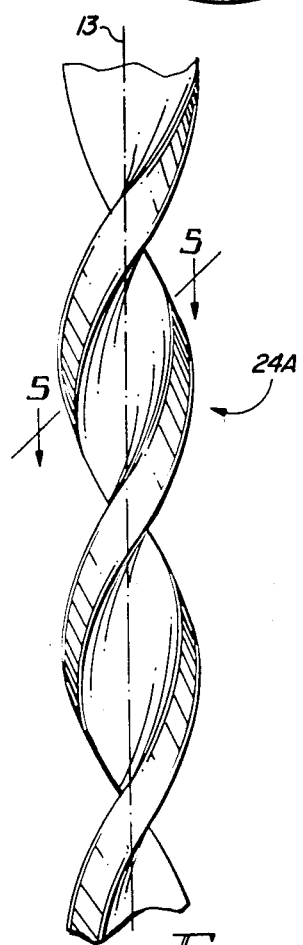
FIG. 4 is a front view of an alternate embodiment of the elongate helical neck of the thread gauge of FIGS. 1 to 3; and, FIG. 5 is a section view of the helical neck of FIG. 4 taken along section line 5—5 thereof.
Figure 5:
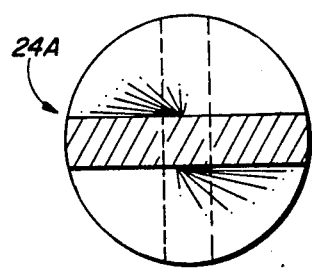

In FIGS. 4 and 5, helical neck 24A illustrates an alternate construction of neck 24. A teflon member 23 or a drive member formed out of another appropriate material can be press fit or otherwise formed to slidably contour to neck 24A.

Having described my invention in such terms as to enable those skilled in the art to understand and practice it, and having identified the presently preferred embodiments thereof, I claim:

1. A thread measuring tool comprising
   (a) an elongate helical neck having a longitudinal axis and a first end and a second end;
   (b) a threaded gauge attached to said first end of said neck;
   (c) a drive member slidably mounted on said neck and having an inner helical surface slidably contacting said neck and shaped and dimensioned such that linear non-rotational displacement of said drive member along said neck in a direction of travel generally parallel said longitudinal axis generates forces on said helical neck causing said neck and threaded gauge to rotate.

2. A method for turning the threads of a threaded gauge over the threads of a workpiece to check to correctness of the workpiece threads, comprising the steps of
   (a) connecting said threaded gauge to an elongate helical neck having a longitudinal axis and a first end and a second end;
   (b) slidably mounting a drive member on said helical neck, said drive member having an inner helical surface slidably contacting said neck and shaped and dimensioned such that linear non-rotational displacement of said drive member along said neck in a direction of travel generally parallel said longitudinal axis generates forces on said helical neck causing said neck and threaded gauge to rotate;
   (c) juxtaposing said threaded gauge against said workpiece; and
   (d) displacing said drive member along said neck in said direction of travel generally parallel said longitudinal axis to rotate said neck and rotate said threads of said gauge over said threads of said workpiece.

* * * * *